United States Patent [19]

Brichard et al.

[11] 4,329,244

[45] May 11, 1982

[54] PARTICLES OF STABILIZED PEROXYGENATED COMPOUNDS, PROCESS FOR THEIR MANUFACTURE, AND COMPOSITION CONTAINING SUCH PARTICLES

[75] Inventors: Jean Brichard, Vilvoorde; Jean-Claude Coléry, Brussels; Pierre Sarot, Vilvoorde, all of Belgium

[73] Assignee: Interox (Société Anonyme), Brussels, Belgium

[21] Appl. No.: 160,817

[22] Filed: Jun. 18, 1980

[30] Foreign Application Priority Data

Jun. 21, 1979 [FR] France ................. 79 16344

[51] Int. Cl.³ ............... C11D 7/38; C11D 7/18
[52] U.S. Cl. .................. 252/99; 252/95; 252/186; 427/215
[58] Field of Search ............ 252/99, 95, 186; 427/215

[56] References Cited

U.S. PATENT DOCUMENTS

| 3,159,581 | 12/1964 | Diehl ................. 252/152 |
| 3,992,317 | 11/1976 | Brichard et al. ........... 252/95 X |
| 4,079,016 | 3/1978 | Brahm et al. .............. 252/99 |
| 4,215,097 | 7/1980 | Brichard et al. ........... 423/279 |

FOREIGN PATENT DOCUMENTS

| 805812 | 10/1973 | Belgium . |
| 810288 | 1/1974 | Belgium . |
| 810289 | 1/1974 | Belgium . |
| 813645 | 4/1974 | Belgium . |
| 842014 | 5/1976 | Belgium . |
| 862620 | 1/1978 | Belgium . |
| 1028545 | 4/1958 | Fed. Rep. of Germany . |
| 1065832 | 4/1964 | United Kingdom . |
| 1300855 | 12/1972 | United Kingdom . |
| 1401225 | 11/1977 | United Kingdom . |
| 1519431 | 7/1978 | United Kingdom . |
| 1538893 | 1/1979 | United Kingdom . |

OTHER PUBLICATIONS

Physics, 20, No. 2, pp. 212-214.

*Primary Examiner*—Mayer Weinblatt
*Attorney, Agent, or Firm*—Spencer & Kaye

[57] ABSTRACT

Particles of peroxygenated compounds stabilized with polymers, possessing hydroxyl groups and carboxyl groups, which contain monomeric units of the formula

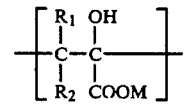

where $R_1$ and $R_2$ represent hydrogen or an alkyl group containing from 1 to 3 carbon atoms and where M represents hydrogen, an alkali metal atom or an alkaline earth metal atom M-. The particles can be used in compositions having a bleaching action.

19 Claims, 2 Drawing Figures

PARTICLES OF STABILIZED PEROXYGENATED COMPOUNDS, PROCESS FOR THEIR MANUFACTURE, AND COMPOSITION CONTAINING SUCH PARTICLES

BACKGROUND OF THE INVENTION

The present invention relates to particles of stabilised peroxygenated compounds, a process for their manufacture, and compositions, possessing a bleaching action, which contain these particles.

It is well-known that certain peroxygenated compounds can be employed as bleaching agents in detergent mixtures in powder form. In the usual domestic detergent powders, it is customary to employ sodium perborate tetrahydrate as the bleaching compound because it is relatively stable to decomposition in a detergent medium. However, it is becoming more and more usual to employ cold washing and soaking techniques for laundry, and for these techniques sodium perborate suffers from the disadvantage of dissolving too slowly at 20° C. To overcome this disadvantage, it has been proposed to introduce, into the detergent powders, other inorganic peroxygenated compounds, especially alkali metal percarbonates, perphosphates and peroxymonosulphates, which have suitable rates of dissolution.

Numerous processes have hitherto been proposed for manufacturing particles of these peroxygenated compounds, but in the majority of cases the particles obtained possess insufficient resistance to attrition, insufficient shelf life in a moist atmosphere or insufficient stability towards other constituents of the detergent powders. A valuable process for the manufacture of particles of sodium percarbonate, which makes it possible to overcome some of the disadvantages mentioned above, consists of introducing a solution of hydrogen peroxide and a solution of sodium carbonate into a fluidised bed containing seeds of a size smaller than those of the particles which it is desired to obtain (French Pat. No. 70/01,315 filed on Jan. 14, 1970 in the name of Solvay & Cie, published under No. 2,076,430). This process makes it possible to obtain particles which are much more resistant to abrasion than those obtained by other processes.

Furthermore, it has also been proposed (French Pat. No. 76/15,716 filed on May 20, 1976 in the name of Interox and published under No. 2,324,574), for the purpose of improving the stability of particles of peroxygenated compounds, to coat them by means of solid coating agents which contain sodium carbonate mixed with sodium silicate and either sodium sulphate or sodium bicarbonate. Though this technique makes is possible very substantially to increase the stability of the particles of peroxygenated compounds, the stability nevertheless remains less than that of the particles of sodium perborate tetrahydrate.

SUMMARY OF THE INVENTION

The object of the present invention is to provide particles of peroxygenated compounds which do not suffer from the disadvantages of the known products and which are particularly stable on storage in a moist atmosphere or in the presence of other usual constituents of washing powders or bleaching powders. These particles furthermore possess good resistance to attrition and to caking, a good rate of dissolution in water, a low content to fines, and good pourability. In addition, they have an active oxygen content close to the theoretical content. Finally, they possess the advantage of having an apparent specific gravity, of the free-flowing material, which is lower than that of the particles obtained in accordance with the earlier processes mentioned above.

To this effect, the present invention relates to particles of peroxygenated compounds stabilised by means of polymers possessing hydroxyl groups and carboxyl groups, containing monomeric units of the formula

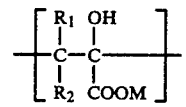

where $R_1$ and $R_2$ represent hydrogen or an alkyl group containing from 1 to 3 carbon atoms and where M represents hydrogen, an alkali metal atom or an alkaline earth metal atom M−.

Preferably, polymers in which M represents hydrogen or an alkaline earth metal atom M− are used.

Preferably, polymers are used in which $R_1$ and $R_2$, which can be identical or different, represent a hydrogen atom or a methyl group. The best results are obtained with polymers where $R_1$ and $R_2$ represent hydrogen.

DETAILED DESCRIPTION OF THE INVENTION

Figure 1:
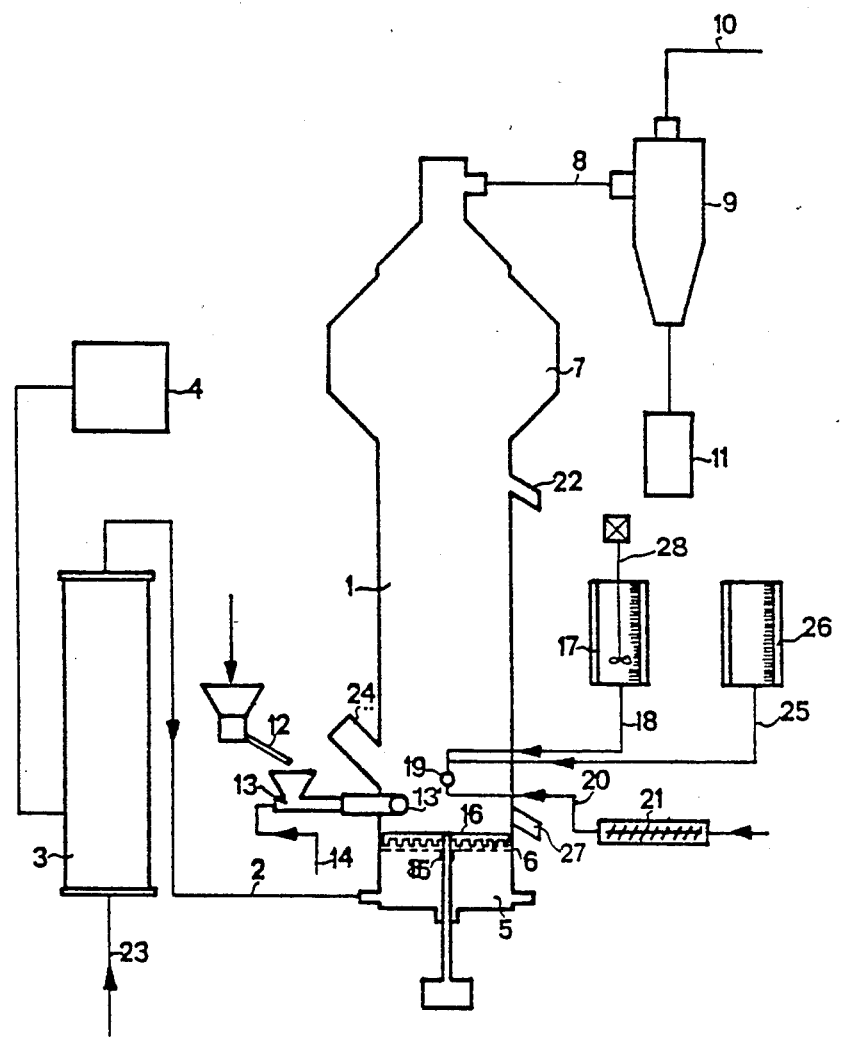
FIGS. 1 and 2 are schematic representations of apparatuses used for carrying out the process of the invention.

The polymers used in the present invention are chosen from amongst homopolymers or copolymers which contain units such as those defined above, which units may be all of the same type or of several different types. If copolymers are used, they are chosen from amongst those which contain at least 50% of units such as those defined above and preferably from amongst those which contain at least 65% of such units. The best results are obtained with polymers which only contain units such as those defined above.

The copolymers which can be used include those which contain units derived from vinyl monomers substituted by groups chosen from amongst hydroxyl groups and carboxyl groups. Advantageously, these copolymers contain acrylic units of the formula

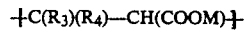

wherein $R_3$ and $R_4$ represent a hydrogen atom or an alkyl group containing from 1 to 3 carbon atoms and where M has the same meaning as above. Amongst these copolymers, it is preferred to use those where $R_3$ and $R_4$ represent hydrogen.

The mean molecular weight of the polymers preferably used according to the invention, as determined by means of the FLORY equation from the combined results of ultracentrifuging and of intrinsic viscosity measurements (L. Manderkern and P. J. Flory, J. Chem. Physics, 1952, 20, pages 212–214), is greater than about 300 and is advantageously between 2,000 and 1,000,000 and preferably between 5,000 and 600,000.

The polymers used can advantageously be employed in the form of the polylactones derived from the alpha-hydroxyacrylic acid polymers containing monomeric units of the formula:

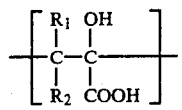

where $R_1$ and $R_2$ have the same meaning as above.

The polyactones which are preferably used according to the invention are intermolecular and intramolecular esters of homopolymers or of copolymers of alpha-hydroxyacrylic acids. In these polylactones, about 30 to 100%, and in general 40 to 100%, of the acid groups of the alpha-hydroxyacrylic monomer units are esterified with alcohol groups. The polylactone derived from unsubstituted poly-alpha-hydroxyacrylic acid has given very good results.

The polymers used can also advantageously be salts of alkaline earth metals, preferably of calcium or of magnesium, in which case the polymers possessing hydroxyl groups and carboxyl groups contain monomeric units of the formula

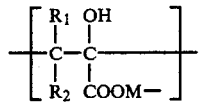

such as those defined above, but where M—represents an alkaline earth metal atom.

The products may be employed directly in the form of the previously produced alkaline earth metal salts of the polymers or, advantageously, in the form of their precursors such as the corresponding polylactones or their alkali metal salts, on the one hand, and, on the other hand, inorganic salts of the corresponding alkaline earth metals. In this case, the inorganic salt is employed in amounts of between 0.1 and 10 times the stoichiometric amount and most commonly in amounts close to the stoichiometric amount. Various inorganic salts can be used for this purpose, in particular salts of the acid corresponding to the peroxygenated compound which is to be stabilised.

Thus, in the case of the stabilisation of a percarbonate, it is possible to employ, as the inorganic salt, a carbonic acid salt of an alkaline earth metal. Mixtures of a polylactone derived from poly-alpha-hydroxyacrylic acid with calcium carbonate or magnesium carbonate have given good results.

It is also possible to employ a soluble alkaline earth metal salt, such as a halide, more particularly a chloride. In this case, the alkaline earth metal salt and the polymer possessing hydroxyl groups and carboxyl groups, in the form of a polylactone or in the form of a salt of the polymer with an alkali metal, can be introduced separately.

The polymers, possessing hydroxyl groups and carboxyl groups, which are used according to the invention are employed in sufficient amounts to allow stabilisation of the peroxygenated compounds. In general, the amount of polymer, possessing hydroxyl groups and carboxyl groups, present in the particles is greater than 0.01% of the weight of the particles, so as to ensure sufficient stabilisation of the peroxygenated compounds. Usually, the contents of the polymer, possessing hydroxyl groups and carboxyl groups, does not exceed 5% of the weight of the particles. Where this content is greater, a less good stabilising effect is observed. Preferably, the content of polymer, possessing hydroxyl groups and carboxyl groups, does not exceed 3% of the weight of the particles. Good results have been obtained if the amounts of polymer, possessing hydroxyl groups and carboxyl groups, present in the particles are between 0.01 and 3% of the weight of the particles. The best results have been obtained with contents of between 0.02 and 2.5%.

The peroxygenated compounds of which the particles according to the invention consist can be of diverse types. In general, they are persalts of alkali metals, these salts normally having a low stability. Amongst these salts, the most extensively used are the percarbonates, the perpyrophosphates, the pertripolyphosphates, the persilicates and peroxymonosulphates of alkali metals and more especially those of sodium and of potassium. The particles of peroxygenated compounds can contain only one type of persalts or a mixture of different persalts. The invention has proved of particular value in the case of particles of sodium percarbonate, of the formula $Na_2CO_3 \cdot 1.5\ H_2O_2$.

In general, the particles according to the invention consist, to the extent of at least 80% and most commonly of at least 85% of their weight, of peroxygenated compounds and of the polymer possessing hydroxyl groups and carboxyl groups. They can furthermore contain small amounts of various other additives such as customary stabilisers for peroxygenated compounds or their precursors, or products conventionally used for coating of particles of peroxygenated compounds.

The stabilisers, other than the polymers possessing hydroxyl groups and carboxyl groups, which can be incorporated into the particles of the invention can be of various types. These include the alkali metal or alkaline earth metal silicates. Their content in general does not exceed 10% of the weight of the particles. The coating agents can also have various compositions. These coating agents can be organic or inorganic. Examples of coating agents are given in Belgian Pat. Nos. 805,812 filed on Oct. 9, 1973, 810,288 filed on Jan. 29, 1974, 810,289 filed on Jan. 29, 1974 and 813,645 filed on Apr. 12, 1974, in the name of Solvay and Cie, and Belgian Pat. Nos. 842,014 filed on May 20, 1976 and 862,620 filed on Jan. 4, 1978, in the name of Interox. In general, inorganic coating agents are very suitable. These include the carbonates, sulphates, silicates and bicarbonates of alkali metals or alkaline earth metals. Good results have been obtained by using sodium carbonate by itself or mixed with sodium sulphate and optionally with sodium silicate. The content of coating agents in general does not exceed 10% of the weight of the particles.

The dimensions of the particles of peroxygenated compounds according to the invention can vary within rather wide limits. In general, the particles have dimensions close to those of the other particles which compose the detergent powders. Usually, they have average dimensions between 0.01 and 20 mm and most commonly between 0.05 and 5 mm. Particles of which at least 80% have a diameter of between 0.1 and 1 mm are very suitable. These particles can optionally be agglomerated in the form of granules or of tablets.

The particles according to the invention in general have an apparent specific gravity, measured on the free-flowing material, of between 0.4 and 1.4 kg/dm$^3$ and most commonly between 0.5 and 1.3 kg/dm$^3$. Their pourability, expressed in terms of the flow time of 250 g of the material through the orifice, of 16 mm diameter, of a short-stemmed analysis funnel, in general does not exceed 10 seconds, and their abrasion index measured according to the process described in standard specification ISO/TC 47/WG 11 (Secretariat —86) 167 of the British Standards Institution is in general less than 10%.

The apparent specific gravity, measured on the free-flowing material, referred to above, is determined by a process similar to that described in A.S.T.M. Standards D 392-38 and B 212-48, recommended respectively for measuring the apparent specific gravity of moulding powders and of metal powders. The apparatus used is however slightly different. It comprises a hopper in the shape of a truncated cone of which the large base has a diameter of 53 mm and the small base, equipped with a shut-off which can be opened completely, has a diameter of 21 mm, the height between the bases being 58 mm and the useful volume being about 60 cm$^3$.

The cylindrical cup, of 50 cm$^3$ volume, has an internal diameter of 37 mm and a height of about 46 mm. The base of the hopper is placed 65 mm above the bottom of the cup. The procedure is identical to that described in the ASTM standards. The shut-off of the hopper is closed and the hopper is filled with the product to be examined, and is levelled flush with the upper edge of the hopper by means of a straight-edge. The cup is placed along the axis of the hopper and the shut-off is opened. After the material has flowed out, it is levelled flush with the upper edge of the cup. The apparent specific gravity of the free-flowing material is equal to the ratio of the weight of material in the cup, expressed in kg, to the volume of the cup, expressed in dm$^3$.

The pourability of the product is characterised as the time of flow of a given amount of product through the orifice of the stem of a calibrated funnel. The process is substantially similar to that described in ASTM Standard Specification D 392-38.

The apparatus consists of a funnel having a polished stainless steel flap valve, the angle of the cone being 60°, the internal diameter 180 mm and the length of the stem 165 mm. The internal diameter of the stem is 16 mm. The test consists of introducing 250 g of this product into the funnel and measuring the flow time after opening the flap valve.

The resistance of the product to setting solid is measured by the following caking test. A 250 cm$^3$ glass vessel equipped with a screw cap is two-thirds filled with the product and is placed in an oven at 55° C. for 24 hours.

The extent of setting solid of the product is subsequently observed and is evaluated on the following assessment scale:

| | |
|---|---|
| 10 | the product flows freely like dry sand |
| 9 | the product flows easily, with some hesitations |
| 8 to 5 | the product has partially set solid |
| 4 to 1 | the product has completely set solid. |

The present invention also relates to a process for the manufacture of particles of stabilised peroxygenated compounds which consists of continuously introducing an aqueous solution containing the precursor of the peroxygenated compound into a fluidised bed drier, continuously feeding the fluidised bed drier with seeds of dimensions smaller than those of the particles which it is desired to obtain, and continuously evaporating, in the drier, the water present in the said aqueous solutions, by means of the fluidising gas which is introduced into the fluidised bed drier, according to which process polymers, possessing hydroxyl groups and carboxyl groups, or precursors, as defined above, of such polymers, are introduced at the same time into the fluidised bed drier.

In general, the polymers possessing hydroxyl groups and carboxyl groups are employed in the form of the corresponding polylactones or in the form of their precursors, namely on the one hand the polylactones or their alkali metal salts and on the other hand the alkaline earth metal salts.

The process of the invention is particularly suitable for the manufacture of particles of stabilised sodium percarbonate. The description which follows refers to the manufacture of this particular product but of course the process can be applied to the manufacture of other persalts, starting from the corresponding salt and hydrogen peroxide.

The description which follows refers to the use of polylactones but of course the process can be applied to the use of other polymers possessing hydroxyl groups and carboxyl groups (or to the use of their precursors), as defined above. Where precursors are used, they can be introduced conjointly or separately. Thus, in the case of the use of alkaline earth metal salts of the polymers containing hydroxyl groups and carboxyl groups, it is possible to dissolve or suspend the alkaline earth metal salt precursor and the polymer precursor in the hydrogen peroxide solution. It is also possible to dissolve or suspend each of the precursors in, respectively, the hydrogen peroxide solution and the carbonate solution.

The polylactones preferably employed are in general introduced into the fluidised bed either in suspension (or solution) in an aqueous solution, or directly in the solid form, as a mixture with the seeds with which the fluidised bed is fed, or in both these forms. The amount of polylactones fed into the fluidised bed is in general between 0.03 and 15 g per 100 g of 100% strength hydrogen peroxide introduced into the fluidised bed. Good results have been obtained if the amount of polylactones is between 0.3 and 9 g of polylactone per 100 g of 100% strength hydrogen peroxide. Good results have been obtained if the polylactone is introduced into the fluidised bed in the form of a suspension in the aqueous hydrogen peroxide solution.

The aqueous solutions containing hydrogen peroxide can contain greatly different amounts of this product. Advantageously, aqueous solutions containing from 5 to 90% by weight of hydrogen peroxide and preferably from 15 to 70% by weight are used. Lower concentrations are of little value economically because the amount of water to be evaporated is then very high. On the other hand, it is rather undesirable to use higher concentrations because the solutions are dangerous to handle.

The aqueous solutions containing sodium carbonate can contain very different amounts of this product, within the limits of solubility of the latter, these limits being of course a function of the temperature of the solution. In general, solutions containing more than 5% by weight of sodium carbonate and, most commonly, from 10 to 35% by weight of sodium carbonate, $Na_2CO_3$, are used.

It is also possible to introduce other additives, such as, for example, conventional stabilisers for sodium percarbonate, or their precursors, either to the solution containing the hydrogen peroxide or to the solution containing the sodium carbonate.

The molar ratio of hydrogen peroxide:sodium carbonate which is used is in general about 1.5. Most commonly, a ratio of between 1.3 and 1.7 and preferably between 1.4 and 1.6 is used.

The solutions of the reactants are introduced simultaneously into the fluidised bed, either separately through separate nozzles or conjointly through one and the same nozzle, premixing taking place at the nozzle outlet. Several points of introduction of the reaction solution or solutions can be provided. Preferably, the solutions are introduced into the lower half of the fluidised bed. Various types of apparatus which are in themselves known, such as pneumatic injectors and the like, can be used for this purpose.

The temperature of the solutions can vary within rather wide limits. Preferably, it does not exceed the temperature of the fluidised bed, so as to avoid premature crystallisation in the injectors if concentrated solutions are used. In general, temperatures between ambient temperature and 70° C., and preferably between 20° and 50° C., are used. The temperatures of the two solutions need not necessarily be the same.

The temperature of the fluidised bed is chosen so as not to exceed the temperature at which sodium percarbonate begins to decompose. It is generally between ambient temperature and 100° C., usually between 35° and 95° C. and preferably between 45° and 85° C. The temperature of the air or other carrier gas introduced at the bottom of the fluidised bed, for example through a screen or through a distribution plate, can vary within wide limits depending especially on the bed temperature which it is desired to maintain, the amount of water to be removed and the flow rate of the carrier gas. Most commonly, the temperature is between 80° and 250° C., and preferably between 100° and 200° C. However, other temperatures may also be suitable. Higher temperatures are generally used less because they can cause losses of hydrogen peroxide through evaporation or through decomposition.

The carrier gas can be any gas which is inert towards the constituents of the fluidised bed. Usually, nitrogen, rare gases, oxygen or air are employed. Air is particularly suitable. The moisture content of the carrier gas collected at the outlet of the fluidised bed is in general kept at below 90% and preferably at below 70% so as to avoid blocking the fluidised bed.

The seeds used can have various dimensions. However, their dimensions are always less than those of the desired particles. Furthermore, the seeds can be of various origins. When starting up an installation, seeds which are preferably small particles of sodium percarbonate obtained either from another installation or by a wet method are introduced into the bed. Particles of other inorganic persalts such as sodium perborate monohydrate, sodium perborate tetrahydrate, persilicates, persulphates or phosphate perhydrates can also prove suitable because they also ensure uniform distribution of the active oxygen in the particles obtained.

In the course of operation, the presence, in the fluidised bed, of seeds of smaller dimensions than those of the particles which it is desired to obtain is also essential. In general, the seeds consist, at least partly, of fine sodium percarbonate produced normally in the bed. It is also possible to increase the proportion of seeds by deliberately introducing into the bed fine granules of sodium percarbonate or by mechanically breaking up, in the actual bed, a part of the granules already formed, or by using these two methods simultaneously.

The fine particles of sodium percarbonate which can be introduced into the bed originate in this case from the waste material from the production operation after grinding—outside the fluidised bed—excessively large granules of sodium percarbonate produced in the drier, or from the recycling of the fines carried out of the bed by the fluidisation gas, or from manufacture by another process, if necessary with grinding of sodium percarbonate particles, or simultaneously from several of these possible sources.

It is also possible to equip the fluidised bed drier with one or more devices such as grinders, stirrers or scrapers which mechanically destroy the agglomerates and at the same time cause the information of seeds. These devices also make it possible to prevent the bed from packing together and setting solid. In fluidised beds of large dimensions, these devices are however little used because in such beds the formation of agglomerates is not observed. In this case it is in general preferred to introduce into the fluidised bed recycled sodium percarbonate or waste sodium percarbonate, if it is desired to increase the proportion of seeds in the bed. The technique preferentially used for increasing the proportion of seeds in the bed consists of recycling the fines carried out of the bed by the fluidisation gas.

The process of the invention can be carried out continuously or discontinuously. The fluidised bed drier can have a cylindrical, cylindro-conical or parallelepiped shape or any other shape which permits application of the process.

The solid products feed can be effected in any known manner, for example by means of a Venturi system. The solid charge in general has an average particle diameter of less than 0.5 mm, most frequently between 0.01 and 0.45 mm. Of course these values are only given by way of example and it is possible to use particles of different dimensions.

The particles can be discharged by means of any known device, for example by elutriation through the bottom of the drier or through a side tube located at the base of the drier or by overflow through a side tube, in which case this tube determines the height of the fluidised bed.

The gases which have left the fluidised bed pass through a device for separating off the fines, such as, for example, a cyclone. The gases which are withdrawn can be discharged into the atmosphere or can, if desired, be recycled partially or completely to the fluidised bed, after removing the water vapour, contained in the gases, by drying or condensation. The dimensions of the particles obtained depend especially on the quantity of seeds present in the bed, the size of the particles being inversely proportional to the quantity of fine sodium percarbonate particles voluntarily introduced into the bed, and to the degree of use of devices for mechanically breaking up the particles (grinders and the like) which may be located in the bed.

The dimensions of the particles also depend on the gas pressure in the injector or injectors by means of which the solutions can be introduced into the fluidised bed, the size of the particles being inversely proportional to the pressure.

Accordingly, the size of the particles can easily be regulated to have the desired value, by varying the proportion of seeds in the bed either by introducing seeds or by breaking up the particles within the bed or by varying the pressure in the injectors or by simultaneously using these two processes.

The sodium percarbonate particles obtained according to the process of the invention can advantageously be coated with coating agents which are in themselves known. These can be of an organic or inorganic type, as indicated above.

This coating can be carried out in accordance with any technique which is in itself known. The fluidised bed techniques such as those described, for example, in Belgian Pat. No. 842,014 filed on May 20, 1976 in the name of Interox have proved very advantageous to use.

Figure 2:
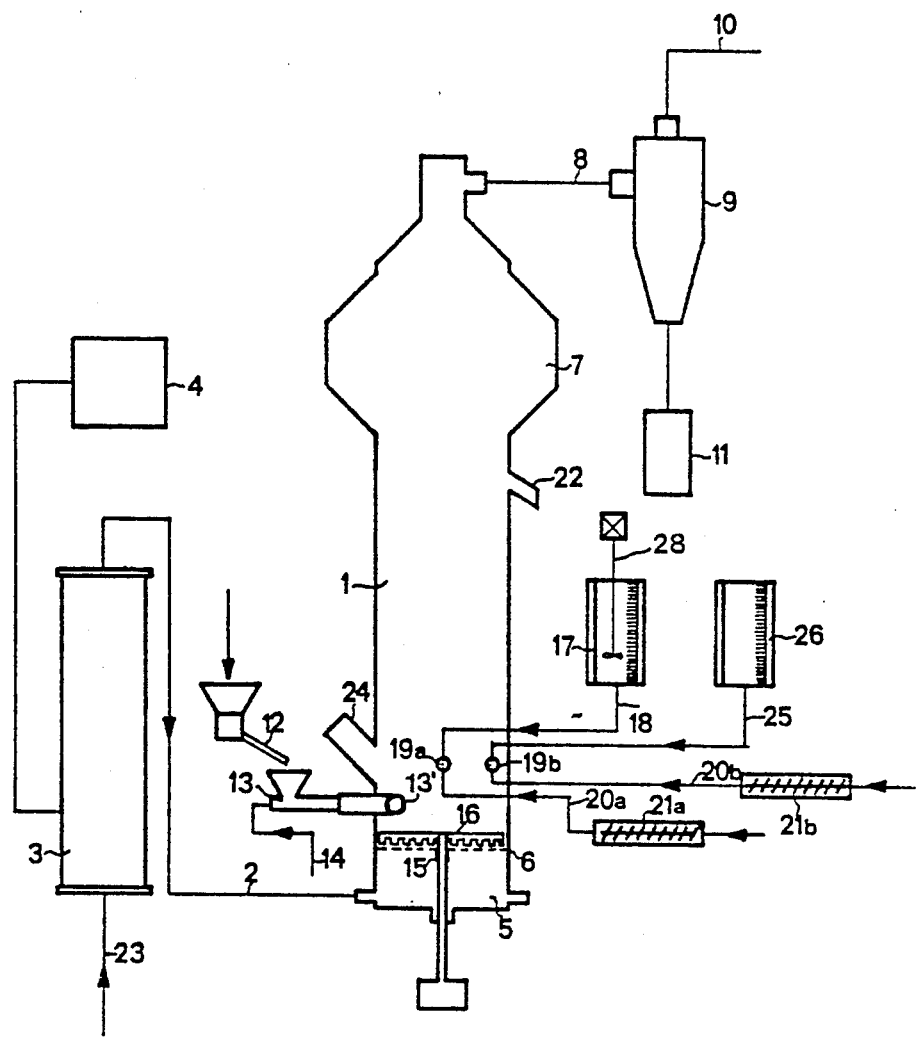

The process according to the invention can advantageously be carried out in apparatuses such as those shown in the attached FIGS. 1 and 2, which represent different ways of carrying out the process according to the invention.

FIG. 1 represents a drier, employing a fluidised bed of particles, 1 the bed being fluidised by means of a gas such as air which enters the system through the line 2 after having been preheated in a preheater 3, which is fed with air through line 23 and which is at a temperature controlled by means of a regulator 4. The hot air passes into the wind box 5, traverses the grid 6 and enters the fluidised bed 1, above which is a zone 7 which allows a proportion of the fines to be returned to the fluidised bed. The grid 6 has a central hole 15 through which the axle of a scraper 16 with rigid blades can pass. A grinder can be introduced into the bottom of the bed through a tube 24.

The gases leaving the fluidised bed pass through the line 8 into a collecting device for fines, or cyclone, 9 and leave the apparatus via the fan 10. The fines are recovered in 11.

The seeds, consisting in particular of all of the fines recovered in 11, are passed, through a vibrating chute 12, into the fluidised bed via the tube 13' by means of a Venturi 13 fed with compressed air through the line 14. The solid polylactone can also be fed in through this line. According to a variant which is not shown, the fines collected in 9 can be directly passed into the tube 13'.

The solution containing the hydrogen peroxide leaves the thermostatically controlled storage reservoir 17, which is kept at the desired temperature, through the line 18, and the solution containing the sodium carbonate leaves the thermostatically controlled storage reservoir 26, also kept at the desired temperature, through the line 25; the two temperatures can be identical or different. A mixer 28 makes it possible to homogenise the suspension of polylactone in the aqueous hydrogen peroxide solution, if the polylactone is introduced in this form into the fluidised bed. The two solutions are mixed and sprayed into the fluidised bed by means of a nozzle 19 which is fed with compressed air through the line 20, the air being heated in 21.

The granular product is collected either by overflowing through the line 22 or by elutriation through the line 27.

FIG. 2 represents an apparatus similar to that shown in FIG. 1, in which the single nozzle is replaced by two nozzles and in which there is no provision for removal by elutriation through the base of the reactor.

The solution containing hydrogen peroxide leaves the thermostatically controlled storage reservoir 17, kept at the desired temperature, through the line 18 and is sprayed into the fluidised bed by means of a nozzle 19a, fed with compressed air through the line 20a, the air being heated in 21a.

The solution containing sodium carbonate leaves the thermostatically controlled storage reservoir 26, kept at the desired temperature, through the line 25 and is sprayed into the fluidised bed by means of a nozzle 19b, fed with compressed air through the line 20b, the air being heated in 21b.

The other characteristics of the apparatus are identical to those of the apparatus shown in FIG. 1.

The present invention further relates to the use of the particles of stabilised peroxygenated compounds in compositions which possess a bleaching action, such as compositions for washing, soaking, cleaning, bleaching, dishwashing and stain-removing.

The compositions having a bleaching action in general contain:

from 0.1 to 90% by weight of particles of peroxygenated compounds which have been stabilised according to the invention, from 0 to 50% by weight of cationic, anionic or non-ionic surface-active agents such as those mentioned in the book "Surface Active Agents" by A. M. Schwarz and J. W. Perry or in U.S. Pat. No. 3,159,581, from 0 to 50% by weight of one or more known "builders" such as polyphosphates, polymers possessing carboxyl groups, sodium nitrilotriacetate and salts of ethylenediaminetetraacetic acid, and from 0 to 20% by weight of various additives such as, in particular, enzymes, optical whiteners, agents to counteract soil redeposition, pH regulators, persalt activators, dyestuffs, perfumes, corrosion inhibitors, tarnishing inhibitors and disinfectants.

The washing, cleaning, soaking or bleaching processes which employ such compositions are in general carried out at temperatures of 10° to 130° C. and the said compositions are employed in the processes at the rate of 0.5 to 20 g/liter of aqueous bath.

Examples of the manufacture of stabilised sodium percarbonate particles, and examples showing the properties of these particles, are given below in order to illustrate the invention, without however limiting its scope.

EXAMPLES 1 TO 14

The experiments summarised below were carried out continuously, in an apparatus of the same type as that shown in FIG. 1. The cylindrical-section drier used comprises two portions of different diameters. The lower portion has a diameter of 152 mm and a height, above the air distribution grid, of 915 mm, whilst the upper portion has a diameter of 305 mm and a height of 300 mm.

The particles issue by overflow through a side tube 22 located at 600 mm from the distribution grid.

The bed of particles is fluidised by introducing a stream of heated air through the gas distribution plate. The temperature of the fluidised layer is 343° K. Initially, the drier contains unstabilised sodium percarbonate particles. The mean diameter of this charge is about 0.35 mm.

The drier is fed continuously with an aqueous hydrogen peroxide solution at a temperature of 298° K. and an aqueous sodium carbonate solution at a temperature of 313° K., by means of a nozzle which dips into the fluidised bed. The compositions of the aqueous hydrogen peroxide solution and of the aqueous sodium carbonate solution as well as the working conditions when the apparatus is running are shown in Table I below.

Experiment 1 was carried out by eay of comparison; it relates to a method of manufacture of sodium percarbonate without the stabiliser according to the invention. This experiment was carried out in an apparatus of the same type as that shown in FIG. 1. The other experiments were carried out in accordance with the invention.

TABLE I

| Example | | 1 | 2 | 3 | 4 | 5 | 6 | 7 |
|---|---|---|---|---|---|---|---|---|
| Fluidising air | | | | | | | | |
| temperature | K | 493 | 476 | 463 | 483 | 485 | 487 | 470 |
| flow rate | $m^3$/hr* | 50 | 56 | 60 | 58 | 58 | 58 | 58 |
| Initial charge of the bed | kg | 4 | 3.5 | 3.5 | 3.5 | 3.5 | 3.5 | 3.5 |
| Feed to the nozzles | | | | | | | | |
| Air | | | | | | | | |
| flow rate | $m^3$/hr* | 7 | 6.1 | 6.1 | 6.1 | 6.0 | 6.0 | 5.9 |
| temperature | K | 328 | 331 | 343 | 343 | 343 | 343 | 318 |
| absolute pressure | $10^{-5}$ Pa | 2.7 | 2.5 | 2.5 | 2.5 | 2.5 | 2.5 | 2.5 |
| Hydrogen peroxide solution | | | | | | | | |
| flow rate | kg/hr | 1.500 | 1.600 | 1.340 | 1.700 | 1.680 | 1.700 | 1.420 |
| $H_2O_2$ concentration | % by weight | 28.5 | 27.9 | 29.6 | 28.4 | 28.1 | 27.8 | 26.7 |
| $MgSO_4 \cdot 7H_2O$ concentration | % by weight | 0.85 | 0.8 | 0.8 | 0.85 | 0.85 | 0.84 | 0.8 |
| poly-α-hydroxyacrylic acid poly-lactone concentration | % by weight | — | — | — | 0.47 | 0.74 | 1.32 | — |
| Mg poly-α-hydroxyacrylate concentration | % by weight | | | | | | | |
| Ca poly-α-hydroxyacrylate concentration | % by weight | | | | | | | |
| Sodium carbonate solution | | | | | | | | |
| flow rate | kg/hr | 3.000 | 3.207 | 2.725 | 3.425 | 3.410 | 3.400 | 2.690 |
| temperature | K | 313 | 313 | 313 | 313 | 313 | 313 | 313 |
| $Na_2CO_3$ concentration | % by weight | 30.0 | 29.5 | 29.6 | 29.7 | 29.4 | 29.4 | 29.5 |
| $SiO_2$ concentration | % by weight | 0.32 | 0.32 | 0.32 | 0.32 | 0.32 | 0.32 | 0.32 |
| Na poly-α-hydroxyacrylate concentration | % by weight | — | 0.9 | — | — | — | — | — |
| $Na_6(PO_3)_6$ concentration | % by weight | 0.3 | 0.3 | 0.3 | 0.3 | 0.3 | 0.3 | 0.3 |
| Molar Ratio of $H_2O_2/Na_2CO_3$ as introduced | | 1.48 | 1.47 | 1.52 | 1.50 | 1.48 | 1.48 | 1.50 |
| Introduction of stabiliser into the recycled fines | | | | | | | | |
| Na poly-α-hydroxyacrylate | g/hr | — | — | 28 | — | — | — | — |
| poly-α-hydroxyacrylic acid polylactone | g/hr | — | — | — | — | — | — | 12 |
| Production | kg/hr · $m^2$ of bed | 62.7 | 78.5 | 67.8 | 78.5 | 75.7 | 79.1 | 62.1 |
| Yield of $H_2O_2$ | % | 96 | 96 | 94 | 97 | 98 | 96 | 94 |

| Example | | 8 | 9 | 10 |
|---|---|---|---|---|
| Fluidising air | | | | |
| temperature | K | 473 | 483 | 483 |
| flow rate | $m^3$/hr* | 58 | 59 | 59 |
| Initial charge of the bed | kg | 3.5 | 3.5 | 3.5 |
| Feed to the nozzles | | | | |
| Air | | | | |
| flow rate | $m^3$/hr* | 6.1 | 6.1 | 6.5 |
| temperature | K | 343 | 343 | 343 |
| absolute pressure | $10^{-5}$ Pa | 2.5 | 2.5 | 2.8 |
| Hydrogen peroxide solution | | | | |
| flow rate | kg/hr | 1.360 | 1.735 | 1.71 |
| $H_2O_2$ concentration | % by weight | 28.5 | 28.5 | 28.1 |
| $MgSO_4 \cdot 7H_2O$ concentration | % by weight | 0.8 | 0.85 | 0.85 |
| poly-α-hydroxyacrylic acid poly-lactone concentration | % by weight | — | — | — |
| Mg poly-α-hydroxyacrylate concentration | % by weight | | 0.98 | — |
| Ca poly-α-hydroxyacrylate concentration | % by weight | | — | 0.98 |
| Sodium carbonate solution | | | | |
| flow rate | kg/hr | 2.755 | 3.38 | 3.45 |
| temperature | K | 313 | 313 | 313 |
| $Na_2CO_3$ concentration | % by weight | 29.4 | 28.2 | 29.7 |
| $SiO_2$ concentration | % by weight | 0.32 | 0.31 | 0.32 |
| Na poly-α-hydroxyacrylate concentration | % by weight | — | — | 0.3 |
| $Na_6(PO_3)_6$ concentration | % by weight | 0.3 | 0.3 | 0.3 |
| Molar ratio of $H_2O_2/Na_2CO_3$ as introduced | | 1.47 | 1.55 | 1.51 |
| Introduction of stabiliser into the recycled fines | | | | |

TABLE I-continued

| | | | | |
|---|---|---|---|---|
| Na poly-α-hydroxyacrylate | g/hr | — | — | — |
| poly-α-hydroxyacrylic acid polylactone | g/hr | 27 | — | — |
| Production | kg/hr . m² of bed | 67.8 | 89 | 78.7 |
| Yield of H₂O₂ | % | 94 | 90 | 97 |

| Example | | 11 bis | 12 | 13 | 14 |
|---|---|---|---|---|---|
| Fluidising air | | | | | |
| temperature | K | 473 | 483 | 470 | 471 |
| flow rate | m³/hr* | 59 | 59 | 58 | 56 |
| Initial charge of the bed | kg | 3.5 | 3.5 | 3.5 | 3.5 |
| Feed to the nozzles | | | | | |
| Air | | | | | |
| flow rate | m³/hr* | 7.5 | 7.5 | 8.5 | 7.0 |
| temperature | K | 327 | 329 | 327 | 327 |
| absolute pressure | 10⁻⁵ Pa | 2.5 | 2.5 | 2.75 | 2.75 |
| Hydrogen peroxide solution | | | | | |
| flow rate | kg/hr | 1.65 | 1.80 | 1.57 | 1.56 |
| H₂O₂ concentration | % by weight | 29.7 | 29.6 | 28.0 | 27.7 |
| MgSO₄ . 7H₂O concentration | % by weight | 0.85 | 0.85 | — | |
| poly-α-hydroxyacrylic acid polylactone concentration | % by weight | 0.64 | 2.1 | | |
| Mg poly-α-hydroxyacrylate concentration | % by weight | | | | |
| Ca poly-α-hydroxyacrylate concentration | % by weight | | | | |
| CaCO₃ concentration | % by weight | 2.4 | | | |
| MgCO₃ concentration | % by weight | | 1.9 | | |
| CaCl₂ concentration | % by weight | | | 0.69 | |
| MgCl₂ concentration | % by weight | | | 0.35 | 0.92 |
| Sodium carbonate solution | | | | | |
| flow rate | kg/hr | 3.40 | 3.83 | 3.24 | 3.25 |
| temperature | K | 313 | 313 | 313 | 313 |
| Na₂CO₃ concentration | % by weight | 29.6 | 29.6 | 28.1 | 28.1 |
| SiO₂ concentration | % by weight | 0.31 | 0.31 | 0.28 | 0.28 |
| Na poly-α-hydroxyacrylate concentration | % by weight | | | 0.65 | 0.65 |
| Na₆(PO₃)₆ concentration | % by weight | 0.3 | 0.3 | 0.3 | 0.3 |
| Molar ratio of H₂O₂/Na₂CO₃ as introduced | | 1.51 | 1.50 | 1.52 | 1.47 |
| Introduction of stabiliser into the recycled fines | | | | | |
| Na poly-α-hydroxyacrylate | g/hr | | | | |
| poly-α-hydroxyacrylic acid polylactone | g/hr | | | | |
| Production | kg/hr . m² of bed | 69.5 | 84.4 | 62.8 | 63.0 |
| Yield of H₂O₂ | % | 94 | 92 | 91 | 93 |

*measured under normal temperature and pressure conditions

EXAMINATION OF THE PRODUCTS

The various particles obtained in Examples 2 to 14, respectively referred to as product 2 to product 14, were compared with a product obtained in Comparison Example 1, referred to as product 1.

The results are summarised in Table II below.

TABLE II

| Product from Example | Active oxygen % by weight | Apparent specific gravity kg/dm³ |
|---|---|---|
| 1 | 14.3 | 1.19 |
| 2 | 14.0 | 1.13 |
| 3 | 14.1 | 1.14 |
| 4 | 14.4 | 1.16 |
| 5 | 14.4 | 1.13 |
| 6 | 14.0 | 1.08 |
| 7 | 14.1 | 1.18 |
| 8 | 14.0 | 1.12 |
| 9 | 14.3 | 1.15 |
| 10 | 14.3 | 1.19 |

STABILITY OF THE PRODUCTS

The object of these experiments is to show the stability of the products according to the invention during storage in the presence of the other constituents of an enzyme-free washing powder, and to compare it with that of the reference product 1 and of commercial sodium perborate tetrahydrate.

The mixtures used contain 2% by weight of active oxygen, namely 7 g of sodium percarbonate (products 1 to 14) or 10 g of sodium perborate tetrahydrate and 42 g of commercial powders, the compositions of which are given in Tables III and IV respectively.

TABLE III

| Composition of the enzyme-free detergent powder of type A | |
|---|---|
| Constituents | g/100 g |
| Sodium carbonate | 1.8 |
| Sodium silicate | 10.6 |
| Sodium tripolyphosphate | 30.0 |
| Sodium pyrophosphate | 8.1 |
| Sodium sulphate | 13.3 |
| Sodium ethylenediaminetetraacetate | 0.6 |
| Surface-active organic material sodium alkylarylsulphonate ethylene oxide/fatty alcohol condensate soap | 24.4 |
| Water and miscellaneous | 11.2 |

TABLE IV

| Composition of the enzyme-free detergent powder of type B | |
| --- | --- |
| Constituents | g/100 g |
| Sodium silicate | 7.5 |
| Magnesium silicate | 1.9 |
| Sodium tripolyphosphate | 43.7 |
| Sodium sulphate | 21.0 |
| Sodium ethylenediaminetetraacetate | 0.3 |
| Carboxymethylcellulose | 1.2 |
| Surface-active organic materials sodium alkylarylsulphonate ethylene oxide/fatty alcohol condensate soap | 14.4 |
| Water and miscellaneous | 10.0 |

After homogenisation, the mixtures are introduced into cardboard boxes (11.5×7×2 cm) impregnated with microcrystalline wax (permeability 5 g of $H_2O/m^2$.day); the boxes prepared in this way are then stored at 35° C. in an atmosphere of 80% relative humidity (RH) for 4, 8 and/or 12 weeks.

Another series of boxes covered at the front and at the back with a film of cellulose acetate (permeability 550 g of $H_2O/m^2$.day) is also prepared and stored at 28° C. in an atmosphere of 70% relative humidity (RH) for 4, 8 and/or 12 weeks.

After each period of storage, the active oxygen of the powder is determined by direct titration with N/2 $KMnO_4$ and the loss of active oxygen relative to the initial active oxygen is evaluated.

The results of the storage tests in the presence of the powders of type A and B are given respectively in Tables V and VI below. They show the remarkable superiority of the invention relative to the sodium percarbonate particles which do not contain the stabilisers according to the invention.

TABLE V

Uncoated particles - results of the storage tests in boxes in the presence of an enzyme-free detergent powder of type A

| | Particles used | | | % of active oxygen lost after | | | | |
| --- | --- | --- | --- | --- | --- | --- | --- | --- |
| | | Polymer possessing hydroxyl groups and carboxyl groups | | 28° C., 70% RH | | 35° C., 80% RH | | |
| | Peroxygenated compound | nature | quantity* % | 8 weeks | 12 weeks | 4 weeks | 8 weeks | 12 weeks |
| | sodium perborate tetrahydrate | | | 4 | 7 | 4 | 11 | 24 |
| 1 | | — | 0 | 26 | 36 | 30 | 54 | 73 |
| 2 | | Na poly-α-hydroxy-acrylate | 1.28 | | | 26 | 48 | 66 |
| 3 | | | 0.8 | 21 | 28 | 26 | 47 | 69 |
| 4 | Na percarbonate | polylactone of poly-α-hydroxy-acrylic acid | 0.5 | 20 | 29 | 26 | 53 | 73 |
| 5 | | | 0.8 | 22 | 31 | 25 | 49 | 68 |
| 6 | | | 1.5 | 20 | 27 | 21 | 37 | 51 |
| 7 | | | 0.8 | | | 24 | 40 | 59 |
| 8 | | | 1.1 | 20 | 30 | 21 | 37 | 48 |

*expressed as polylactone of poly-alpha-hydroxyacrylic acid

TABLE VI

Uncoated particles - results of the storage tests in boxes in the presence of an enzyme-free detergent powder of type B

| | Particles used | | | % of active oxygen lost after | | | | |
| --- | --- | --- | --- | --- | --- | --- | --- | --- |
| | | Polymer possessing hydroxyl groups and carboxyl groups | | 28° C., 70% RH | | 35° C., 80% RH | | |
| | Peroxygenated compound | nature | quantity* % | 8 weeks | 12 weeks | 4 weeks | 8 weeks | 12 weeks |
| | Na perborate tetrahydrate | | | 2 | 2 | 3 | 7 | 11 |
| 1 | | — | 0 | 15 | 23 | 17 | 35 | 51 |
| 6 | | polylacetone of poly-α-hydroxy-acrylic acid | 1.5 | 15 | 20 | | 31 | 42 |
| 9 | Na percarbonate | Mg poly-α-hydroxy-acrylate | 0.47 | 16 | 20 | | 35 | 48 |
| 10 | | Ca poly-α-hydroxy-acrylate | 0.14 | 16 | 23 | | 38 | 51 |
| 11 | | polylacetone of poly-α-hydroxy-acrylic acid CaCO$_3$ | 0.56 1.15 | 11 | 17 | | 31 | 48 |
| 12 | | polylactone of poly-α-hydroxy-acrylic acid MgCO$_3$ | 1.81 1.63 | 8 | 13 | | 21 | 29 |
| 13 | Na percarbonate | sodium poly-α-hydroxyacrylate CaCl$_2$ | 0.99 0.80 | | | | 10 | |
| 14 | | sodium poly-α-hydroxy acrylate MgCl$_2$ | 1.09 0.82 | | | | 14 | 27 |

*expressed as polylactone of poly-alpha-hydroxyacrylic acid

EXAMPLES 15 TO 28

Products 1 to 14 obtained in carrying out experiments 1 to 14 were coated in a fluidised bed by means of a mixture of sodium carbonate, sodium sulphate and sodium silicate.

The coating is carried out in the same apparatus as that used for the manufacture of the sodium percarbonate according to Examples 1 to 14.

Initially, the bed contains a charge of 3 kg of products 1 to 14 respectively.

The drier is fed continuously with a solution of coating agent containing 138.4 g/kg of sodium carbonate, 61.6 g/kg of sodium sulphate and 5.6 g/kg of waterglass containing 25% of $SiO_2$, in such amount that the coated product contains 5% of coating agent.

Th fluidised bed is kept at a temperature of 333 K.

STABILITY OF THE PRODUCTS

The stability of the coated products was examined in the presence of three different commercial powders, namely of type A and type B, of which the compositions are given in Tables III and IV above, and of type C of which the composition is given in Table VII.

The experiments in the presence of the powders of types A and B were carried out under the same conditions as for the products obtained according to Examples 1 to 14.

The experiments in the presence of the powder of type C were carried out under different conditions, in cardboard boxes impregnated with microcrystalline wax. These boxes were filled with a mixture containing 2.5% by weight of active oxygen, that is to say about 13 g of sodium percarbonate or 18 g of sodium perborate, and 55 g of powder of type C. These boxes were stored during the day at 35° C. and 80% relative humidity (RH) and during the night at 24° C. and 90% relative humidity (RH).

TABLE VII

| Composition of the bleaching powder of type C | |
|---|---|
| Constituents | g/100 g |
| Sodium carbonate | 21.3 |
| Sodium silicate | 16.3 |
| Sodium tripolyphosphate | 9.5 |
| Sodium pyrophosphate | 3.9 |
| Sodium orthophosphate | 1.0 |
| Sodium sulphate | 29.9 |
| Sodium chloride | 9.7 |
| Organic materials | 1.4 |
| Water and miscellaneous | 7.0 |

The results obtained in the presence of the powders of types A, B and C are shown respectively in Tables VIII, IX and X.

TABLE VIII

Coated particles - results of the storage tests in boxes in the presence of an enzyme-free detergent powder of type A

| Particles used | | | % of active oxygen lost after | |
|---|---|---|---|---|
| | Polymer possessing hydroxyl groups and carboxyl groups | | 28° C., 70% RH | 35° C., 80% RH |
| Peroxygenated compound | nature | quantity* % | 12 weeks | 12 weeks |
| | Sodium perborate tetrahydrate | | 7 | 24 |
| 15 | — | 0 | 21 | 31 |
| 16 | Na poly-α-hydroxy-acrylate | 0.8 | 10 | 26 |
| 17 | | | | |
| 18 | Na percarbonate polylactone of poly-α-hydroxyacrylic | 0.5 | 8 | 27 |
| 19 | | 0.8 | 11 | 26 |
| 20 | | 1.5 | 13 | 19 |
| 21 | | 0.8 | 17 | 22 |
| 22 | | 1.1 | 17 | 25 |

*expressed as polylactone of poly-alpha-hydroxyacrylic acid

TABLE IX

Coated particles - results of the storage tests in boxes in the presence of an enzyme-free detergent powder of type B

| Particles used | | | % of active oxygen lost after | | | | | |
|---|---|---|---|---|---|---|---|---|
| | Polymer possessing hydroxyl groups and carboxyl groups | | 28° C., 70% RH | | | 35° C., 80% RH | | |
| Peroxygenated compound | nature | quantity* % | 4 weeks | 8 weeks | 12 weeks | 4 weeks | 8 weeks | 12 weeks |
| | Sodium perborate tetrahydrate | | 0 | 2 | 2 | 3 | 7 | 11 |
| 15 | — | 0 | 4 | 9 | 11 | 11 | 28 | 42 |
| 18 | Na percarbonate polylactone of poly-α-hydroxy-acrylic acid | 0.5 | 3 | 7 | 10 | 10 | 22 | 32 |
| 20 | | 1.5 | | | | 9 | 13 | 33 |
| 23 | Mg poly-α-hydroxy-acrylate | 0.47 | 1 | 5 | 8 | 6 | 15 | 24 |
| 24 | Ca poly-α-hydroxy-acrylate | 0.14 | 3 | 5 | 7 | 7 | 16 | 31 |
| 25 | polylactone of poly-α-hydroxy-acrylic acid | 0.56 | 4 | 5 | 6 | 6 | 8 | 16 |
| | $CaCO_3$ | 1.15 | | | | | | |
| 26 | polyactone of poly-α-hydroxy- | 1.81 | 0 | 2 | 5 | 3 | 7 | 11 |

TABLE IX-continued

Coated particles - results of the storage tests in boxes in the presence of an enzyme-free detergent powder of type B

| | Particles used | | | % of active oxygen lost after | | | | | |
|---|---|---|---|---|---|---|---|---|---|
| | | Polymer possessing hydroxyl groups and carboxyl groups | | 28° C., 70% RH | | | 35° C., 80% RH | | |
| Peroxygenated compound | | nature | quantity* % | 4 weeks | 8 weeks | 12 weeks | 4 weeks | 8 weeks | 12 weeks |
| 27 | Na percarbonate | acrylic acid MgCO₃ sodium poly-α-hydroxyacrylate | 1.63 0.99 | | | | 4 | | |
| 28 | | CaCl₂ sodium poly-α-hydroxyacrylate MgCl₂ | 0.80 1.09 0.82 | | | | | 5 | 14 |

*expressed as polylactone of poly-alpha-hydroxyacrylic acid

TABLE X

Coated particles - results of the storage tests in boxes in the presence of a bleaching powder of type C

| | Particles used | | | By day at 35° C., 80% RH By night at 24° C., 90% RH | | |
|---|---|---|---|---|---|---|
| | | Polymer possessing hydroxyl groups and carboxyl groups | | % of active oxygen lost after | | |
| Peroxygenated compound | | nature | quantity % | 4 weeks | 8 weeks | 12 weeks |
| | sodium perborate tetrahydrate | | | 2 | 4 | 10 |
| 15 | Na percarbonate | — | 0 | 10 | 29 | 36 |
| 18 | | polylactone of poly-α-hydroxyacrylic acid | 0.5 | 10 | 21 | 28 |
| 20 | | | 1.5 | 8 | 14 | 23 |

What is claimed is:

1. Particles comprising at least one inorganic peroxygenated compound and, as stabiliser therefor, a polymer (a) containing monomeric units of the formula

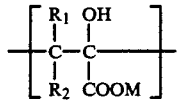

wherein $R_1$ and $R_2$ represent hydrogen and an alkyl group containing from 1 to 3 carbon atoms and where M represents an alkaline earth metal atom or a mixture of an alkaline earth metal inorganic salt and a polymer (b) selected from the group consisting of polylactones derived from polymers of alpha-hydroxyacrylic acid, containing monomeric units of the formula

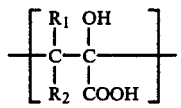

wherein $R_1$ and $R_2$ have the same meaning as above and their alkali metal salts.

2. Particles according to, claim 1, comprising as a stabilizer for said particles, said alkaline earth metal inorganic salt and said polymer selected from the group consisting of polylactones derived from polymers of alpha-hydroxyacrylic acid, containing monomeric units of the formula

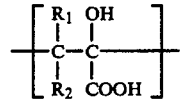

and their alkali metal salts.

3. Particles according to claim 1, wherein $R_1$ and $R_2$ represent hydrogen.

4. Particles according to claim 1, containing from 0.02 to 3% by weight of said polymer (a) or (b) based on the weight of the particles.

5. Particles according to claim 1, which, additionally, are coated with an inorganic coating agent.

6. Compositions possessing a bleaching action, comprising particles of stabilised peroxygenated compounds according to claim 1.

7. Particles according to claim 1, wherein the polymer (a) is a copolymer which contains at least 50% of monomeric units of the formula

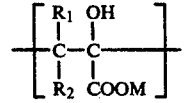

8. Particles according to claim 1, wherein the stabilizer is said polymer (a) which contains monomeric units of the formula

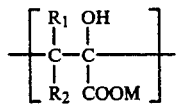

9. Particles according to claim 8 or 1, wherein M— represents an alkaline earth metal selected from the group consisting of calcium and magnesium.

10. Particles according to claim 1, wherein the peroxygenated compound and the polymer (a) or (b) are present in a concentration of at least 80% by weight of the particles.

11. Particles according to claim 1 containing 0.01 to 5% by weight of said polymer (a) or (b), based on the weight of the particles.

12. Particles according to claim 1, wherein the peroxygenated compound is selected from the group consisting of the normally relatively unstable persalts of alkali metals.

13. Particles according to claim 12, wherein the peroxygenated compound is selected from the group consisting of the percarbonates, perpyrophosphates, petripolyphosphates, persilicates and peroxymonosulfates of alkali metals.

14. Particles according to claim 12, wherein the alkali metal of the alkali metal persalt is selected from the group consisting of sodium and potassium.

15. Particles according to claim 12, wherein the peroxygenated compound is sodium percarbonate.

16. Particles according to claim 15, wherein the inorganic coating agent comprises a material selected from the group consisting of the carbonates, sulfates, silicates and bicarbonates of alkali metals and alkaline earth metals.

17. Process for the manufacture of particles comprising at least one stabilised peroxygenated compound which is selected from the group consisting of the normally relatively unstable persalts of alkali metals comprising introducing an aqueous solution containing hydrogen peroxide and an aqueous solution containing the salt corresponding to said persalt continuously into a fluidised bed drier, feeding the fluidised bed drier continuously with seeds whose dimensions are less than those of the particles which it is desired to obtain, and evaporating the water present in said aqueous solutions continuously in the drier by means of the fluidisation gas, wherein a stabilizer for the peroxygenated compound is simultaneously introduced into the fluidised bed drier, said stabilizer being a polymer which possesses hydroxyl groups and carboxyl groups, or its precursor, said polymer containing monomeric units of the formula

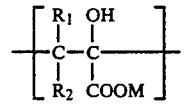

where $R_1$ and $R_2$ represent hydrogen or an alkyl group containing from 1 to 3 carbon atoms and where M represents hydrogen, an alkali metal atom or an alkaline earth metal atom M—.

18. Process according to claim 17, wherein the polymer possessing hydroxyl groups and carboxyl groups is employed in the form of the corresponding solid polylactone.

19. Process according to claim 17, wherein the stabiliser is a polymer (a) containing monomeric units of the formula

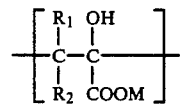

wherein $R_1$ and $R_2$ represent hydrogen and an alkyl group containing from 1 to 3 carbon atoms and where M represents an alkaline earth metal atom or a mixture of an alkaline earth metal inorganic salt and a polymer (b) selected from the group consisting of polylactones derived from polymers of alpha-hydroxyacrylic acid, containing monomeric units of the formula

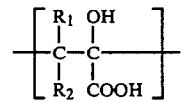

wherein $R_1$ and $R_2$ have the same meaning as above and their alkali metal salts.

* * * * *